(12) United States Patent
Bollinger et al.

(10) Patent No.: US 7,596,935 B2
(45) Date of Patent: Oct. 6, 2009

(54) SUSPENSION SYSTEM FOR A FLOATING HEADER ON AN AGRICULTURAL IMPLEMENT

(75) Inventors: Shane A. Bollinger, Leighton, IA (US); Kent L. Thompson, Otley, IA (US); Rustin V. Bentzinger, Pella, IA (US)

(73) Assignee: Vermeer Manufacturing Company, Pella, IA (US)

( * ) Notice: Subject to any disclaimer, the term of this patent is extended or adjusted under 35 U.S.C. 154(b) by 232 days.

(21) Appl. No.: 11/928,010

(22) Filed: Oct. 30, 2007

(65) Prior Publication Data

US 2009/0107688 A1    Apr. 30, 2009

(51) Int. Cl.
    *A01D 34/00* (2006.01)
(52) U.S. Cl. .................................. 56/14.9; 56/15.8
(58) Field of Classification Search .............. 56/6, 56/7, 10.2 R, 10.2 E, 10.8, 14.7–15.8, 208, 56/228; 172/2–11
    See application file for complete search history.

(56) References Cited

U.S. PATENT DOCUMENTS

| 3,592,106 A | 7/1971 | Baughman |
| 4,177,627 A | 12/1979 | Cicci |
| 4,207,802 A | 6/1980 | Homuth |
| 4,599,852 A | 7/1986 | Kerber |
| 4,719,742 A | 1/1988 | Ermacora |
| 4,723,401 A | 2/1988 | Webster |
| 4,724,661 A | 2/1988 | Blakeslee |
| 4,733,523 A * | 3/1988 | Dedeyne et al. ............... 56/209 |
| 5,060,462 A | 10/1991 | Helfer |
| 5,417,042 A | 5/1995 | Walch |
| 5,566,536 A | 10/1996 | Krafka |
| 5,566,537 A * | 10/1996 | Kieffer et al. ................. 56/15.2 |
| 5,964,077 A * | 10/1999 | Guinn ..................... 56/10.2 E |
| 5,992,133 A | 11/1999 | Walch |
| 6,055,800 A | 5/2000 | Walch |
| 6,085,501 A | 7/2000 | Walch |
| 6,186,043 B1 | 2/2001 | Callies |
| 6,250,055 B1 | 6/2001 | Franet |
| 6,360,516 B1 | 3/2002 | Harkcom |
| 6,662,540 B1 | 12/2003 | Harkcom |
| 6,698,113 B1 | 3/2004 | Jones |
| 6,758,031 B2 | 7/2004 | Franet |
| 6,901,729 B1 * | 6/2005 | Otto et al. ..................... 56/208 |
| 6,907,719 B2 | 6/2005 | Ligouy |
| 7,024,844 B2 | 4/2006 | Schlesser |
| 7,047,714 B1 | 5/2006 | Stephenson |
| 7,404,282 B2 * | 7/2008 | Samejima et al. ............ 56/14.9 |
| 7,430,846 B2 * | 10/2008 | Bomleny et al. ......... 56/10.2 E |
| 7,520,115 B2 * | 4/2009 | Coers et al. ................... 56/15.8 |
| 2004/0035288 A1 | 2/2004 | Hawthorne |
| 2007/0144130 A1 | 6/2007 | Geiser |

FOREIGN PATENT DOCUMENTS

EP        1235477        9/2002

OTHER PUBLICATIONS 1 sheet showing a New Holland—Section 8 Hydraulic Cylinder.

* cited by examiner

*Primary Examiner*—Robert E Pezzuto
(74) *Attorney, Agent, or Firm*—Sturm & Fix LLP (57) ABSTRACT

A suspension system for fixed-frame, towed agricultural implements having at least one floating head. A hydraulic cylinder is used for both lift and suspension of the floating head. A hydraulic accumulator provides expansion room for hydraulic fluid to move in and out of the hydraulic cylinder during suspension.

14 Claims, 9 Drawing Sheets

SUSPENSION SYSTEM FOR A FLOATING HEADER ON AN AGRICULTURAL IMPLEMENT

CROSS REFERENCE TO RELATED APPLICATIONS

U.S. patent application Ser. No. 11/927,866 filed Oct. 30, 2007 (Our Ref. 2-5169-110), is hereby incorporated by reference herein in its entirety.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates generally to an agricultural implement, including a floating header. More particularly, the present invention relates to an improved suspension system for agricultural implements having one or more floating headers wherein the suspension hydraulic cylinders are also used to lift the header for transport.

2. Background Art

A three-point mounted mower with a suspension system is disclosed in U.S. patent application Ser. No. 5,417,042. Disclosed in this application is an example of a mower suspension system with separate elements having a first and a second chamber and separate fluid inlets. These pairs are intended for different functions. One pair is used to lift to a transport position while the other pair is used to transfer oil during operation to suspend the header.

Another example of a three-point mounted mower is disclosed in U.S. Pat. No. 6,085,501. This patent describes a machine where the frame is not lifted to raise the header to a transport position, but where there are effectively two separate cylinders, one to lift into transport, another to suspend the header. The patent describes separate hydraulic rams.

An example of a typical suspension for a trailed mower or mower conditioner is disclosed in U.S. patent application Ser. No. 6,055,800, wherein a cylinder lifts the frame and header to a transport position, while a spring provides a lift force to suspend the header in working position.

The multiplicity of components for lifting and suspending a floating header on a fixed-frame agricultural implement increases complexity, cost, while decreasing reliability.

There is, therefore, a need for a method and apparatus for both lifting and providing suspension for a floating header on a fixed-frame agricultural implement such as a mower.

BRIEF SUMMARY OF THE INVENTION

An object of the present invention is to provide a suspension system for implements having a floating header. The suspension system shall permit the floating header to contact the ground with an appropriate pressure. Another object of this invention is to provide the suspension using the same hydraulic cylinders used to lift the floating header.

In a first embodiment of the present invention, rams in the lift/flotation cylinders of the suspension system are in compression as they raise the header. In a second embodiment of this invention, the ram of the lift/flotation cylinder is in tension as it lifts the floating header.

In both embodiments, a hydraulic accumulator is used to allow for changes in a hydraulic cylinders' extension during operation without the usual valve manipulation to achieve those position changes.

A take-up cylinder is incorporated with lift/flotation cylinders and the hydraulic accumulator to raise and lower the header. When the take-up cylinder is fully retracted, the hydraulic accumulator and the lift/flotation cylinders have reached their greatest pressures, and the lift/flotation cylinders their full extension so the header is fully raised.

A valve is then opened slightly to allow the hydraulic accumulator to depressurize and the take-up cylinder to extend somewhat with the header under the force of gravity. When a predetermined pressure is achieved in the hydraulic accumulator, the valve is again closed. At this predetermined pressure, the header bears on the ground surface with the required force.

In the second embodiment, a lift/flotation cylinder is connected to the hydraulic accumulator by its retract port, thereby raising a sub-frame by retraction. The process is the same as that given for the first embodiment.

Other objects, advantages and novel features of the present invention will become apparent from the following detailed description of the invention when considered in conjunction with the accompanying drawings.

BRIEF DESCRIPTION OF THE DRAWINGS

FIG. 5b is a side elevation view of the rear of the mower in the alternative embodiment shown in FIG. 5a;

FIG. 5c provides a visual layout of the hydraulic circuit in the alternative embodiment as in FIG. 5a.

DETAILED DESCRIPTION OF THE INVENTION

The agricultural mower to which the present invention is applied is a towed, trailed, or drawn mower. This is in contrast to a tractor-mounted mower. Towed mowers have different suspension needs than do mounted mowers, as towed mowers are supported by the ground, independent of the tractor.

Referring now to the drawings wherein like reference numerals correspond to the same or similar parts throughout the drawings, the present invention includes a system for suspending a header 6 from a fixed-frame agricultural mower using hydraulic cylinders 14 and an accumulator 40. (A fixed-frame, for the purposes of this document, including the claims, is herein defined as a frame that does not articulate linearly relative to a ground-engaging wheel axle.) The header 6, in turn, supports a cutter bar 9. In a first embodiment, shown in FIGS. 1-4, a fixed-frame, towed mower 1 is equipped with two one-way hydraulic suspension cylinders 14 located at the outer edges of the frame 15 and supporting the header 6 via pivoting links 42. The pitch control hydraulic cylinder 13 controls the orientation of the cutter bar 9 in relation to the ground, known as pitch, while the tongue swing cylinder 17 is used to control the orientation of the tongue 2 in relation to the frame 15.

Figure 1:
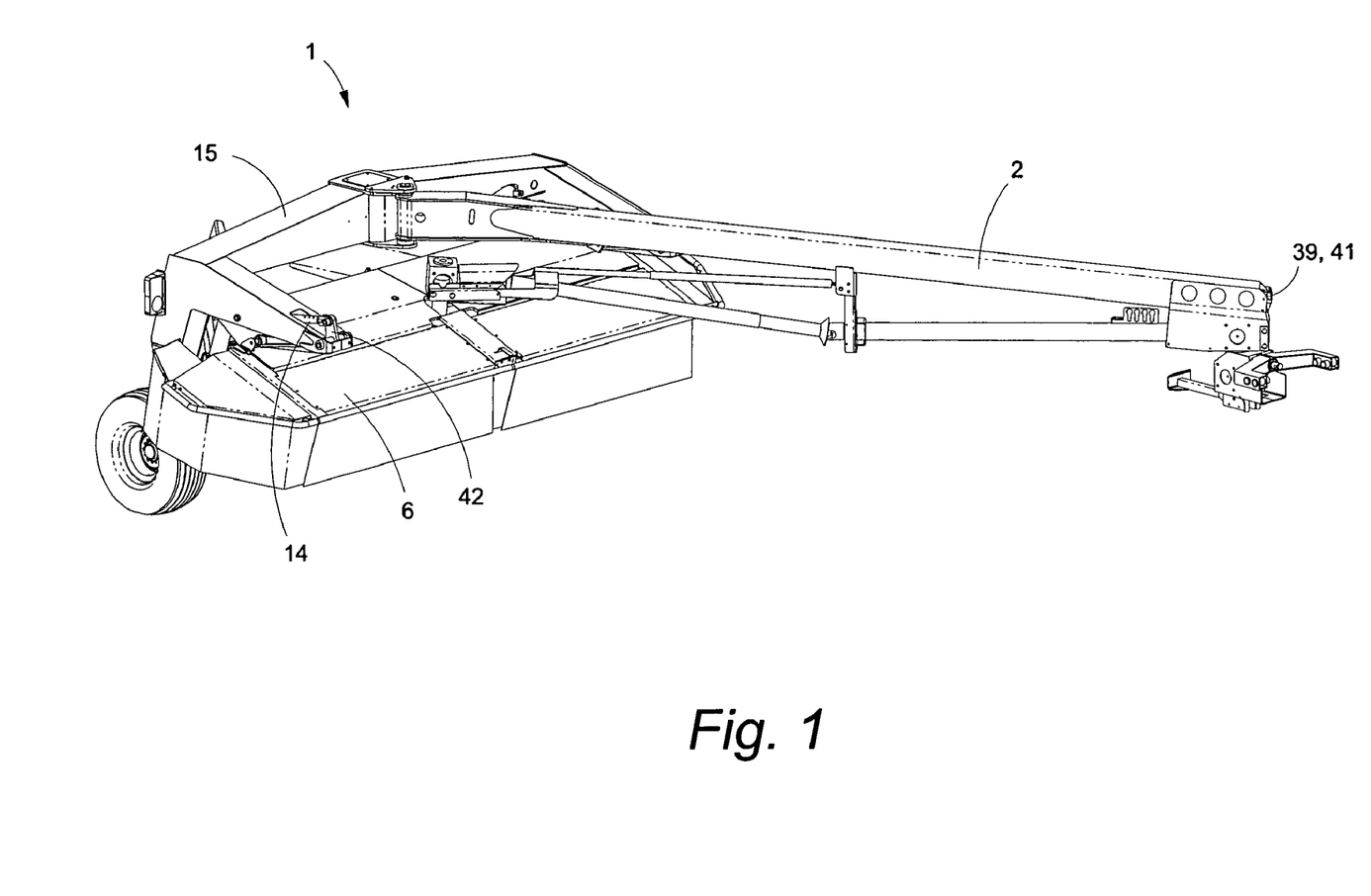
FIG. 1 is a perspective view of a towed agricultural mower having two hydraulic suspension cylinders mounted on the outer edges wherein the header is in a raised position.
Figure 2A:
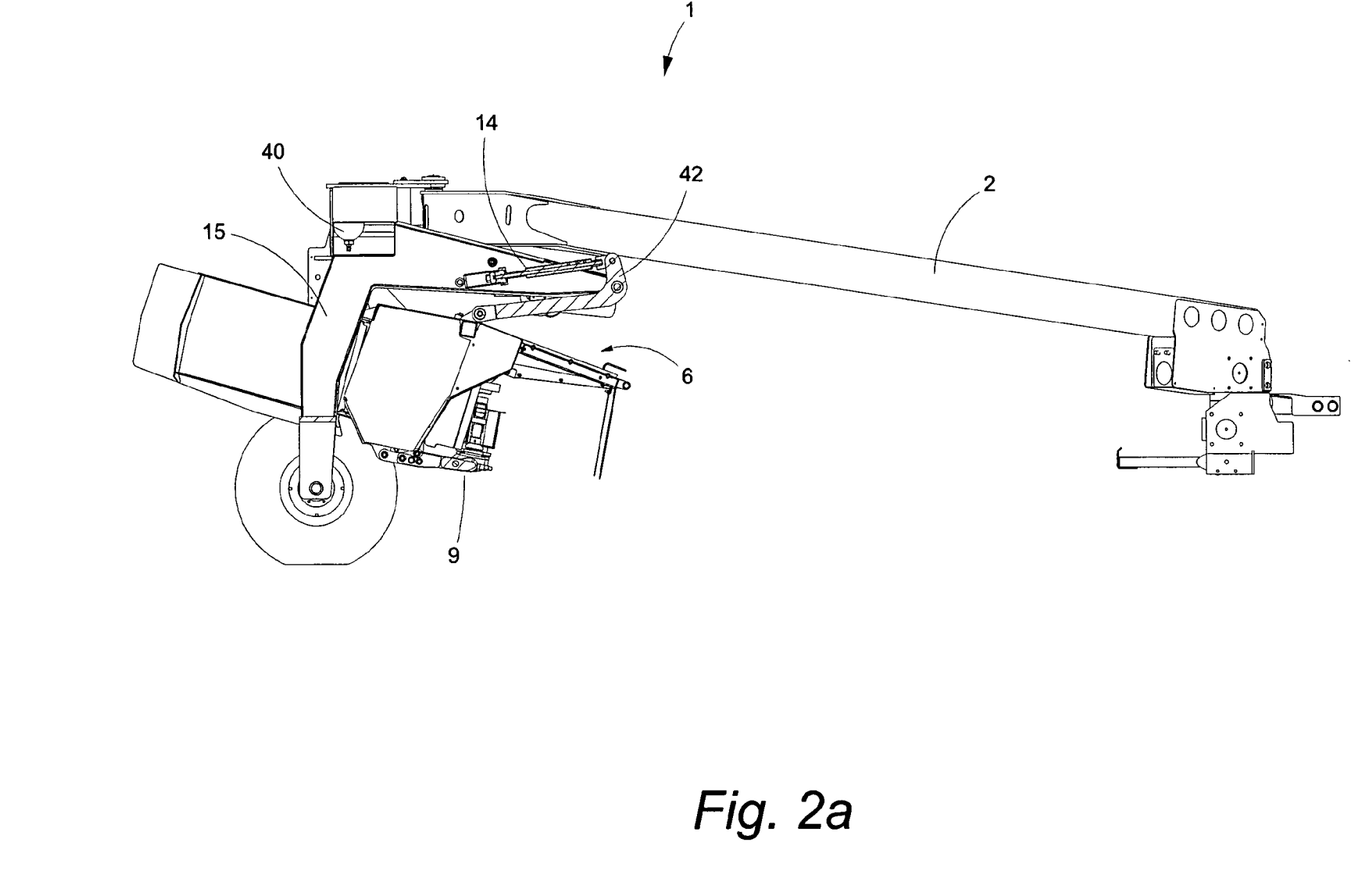
FIG. 2a is a first side elevation view of the agricultural mower with an accumulator also visible.
Figure 2B:
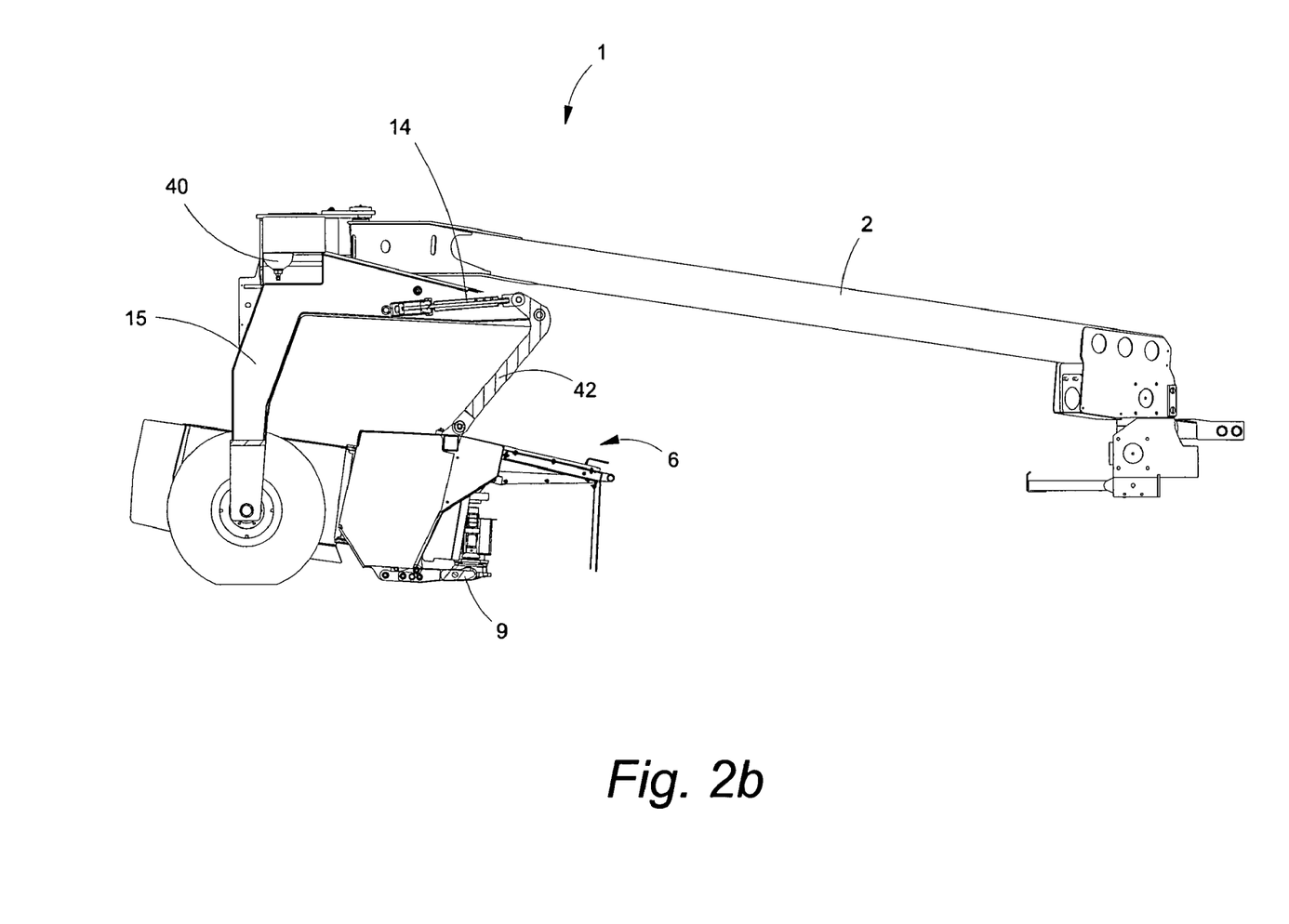
FIG. 2b is a second side elevation view of the agricultural mower with the header in a lowered position.
Figure 3:
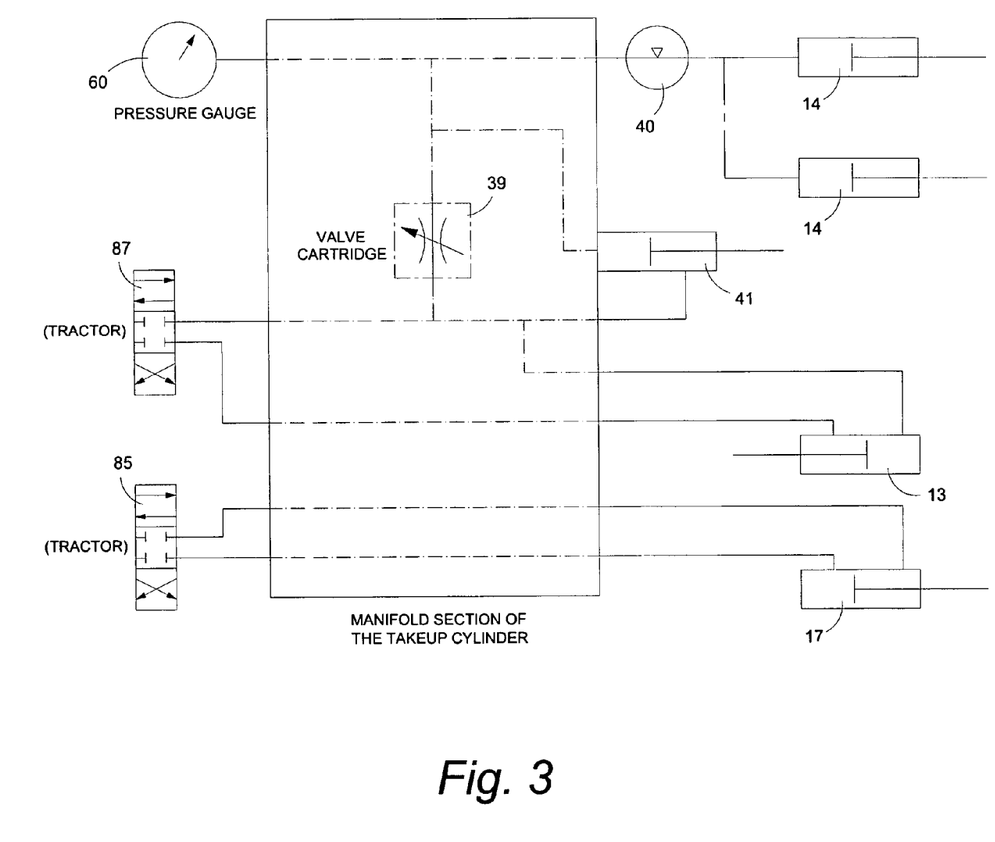
FIG. 3 is a schematic representation of the mower hydraulic system.

FIG. 3 illustrates the hydraulic circuits, including the tongue circuit for controlling tongue swing cylinder 17, with a first tractor remote valve, and the header circuit for controlling the pitch control cylinder 13 and hydraulic suspension cylinders 14 with a second tractor remote valve. The header circuit provides three functions including control of header tilt, flotation, and lift. The flotation is provided by a hydropneumatic accumulator 40 used to exchange volumes of hydraulic fluid with the lift/flotation cylinders. This function is necessary when the header 6 is lowered, to allow the header 6 to follow the terrain, which occurs in the first embodiment when the lift/flotation cylinders 14 are retracted, wherein they cooperate with the accumulator 40. An upper pressurized gas chamber of the hydro-pneumatic accumulator 40 is under pressure. The pressure is shared with a lower chamber of the hydro-pneumatic accumulator 40, open to the hydraulic system.

The header circuit also includes a take-up cylinder 41 and a valve 39. The take-up cylinder 41 controls the oil volume displaced for lifting and lowering the header. The valve 39 may be a manually operated ball valve that can be opened to allow flow, or closed to block flow. The valve 39 may alternatively be a solenoid operated valve capable of allowing flow when a solenoid is energized, and blocking flow then a solenoid is de-energized. The present invention is not limited to these types of valves. The functions of the valve 39 are described below.

In operation the towed mower 1 is hydraulically connected to a tractor (not shown) which provides a source of oil and is used to pump oil into the mower hydraulic systems to perform a variety of functions including:

1) to control the position of the mower 1 relative to the tractor, the cylinder 17, as controlled by the first tractor remote valve 85 is extended or retracted, thereby changing the orientation of the tongue 2 relative to the frame 15;

2) to control the position of the header 6 relative to the ground, the second tractor remote valve 87 is moved to one extreme position which will cause the header 6 to lift, and when moved to the other extreme position will cause the header 6 to lower, and when left in the middle position will hold the header 6 in a set position;

3) charging the lift/flotation circuit.

Figure 4:
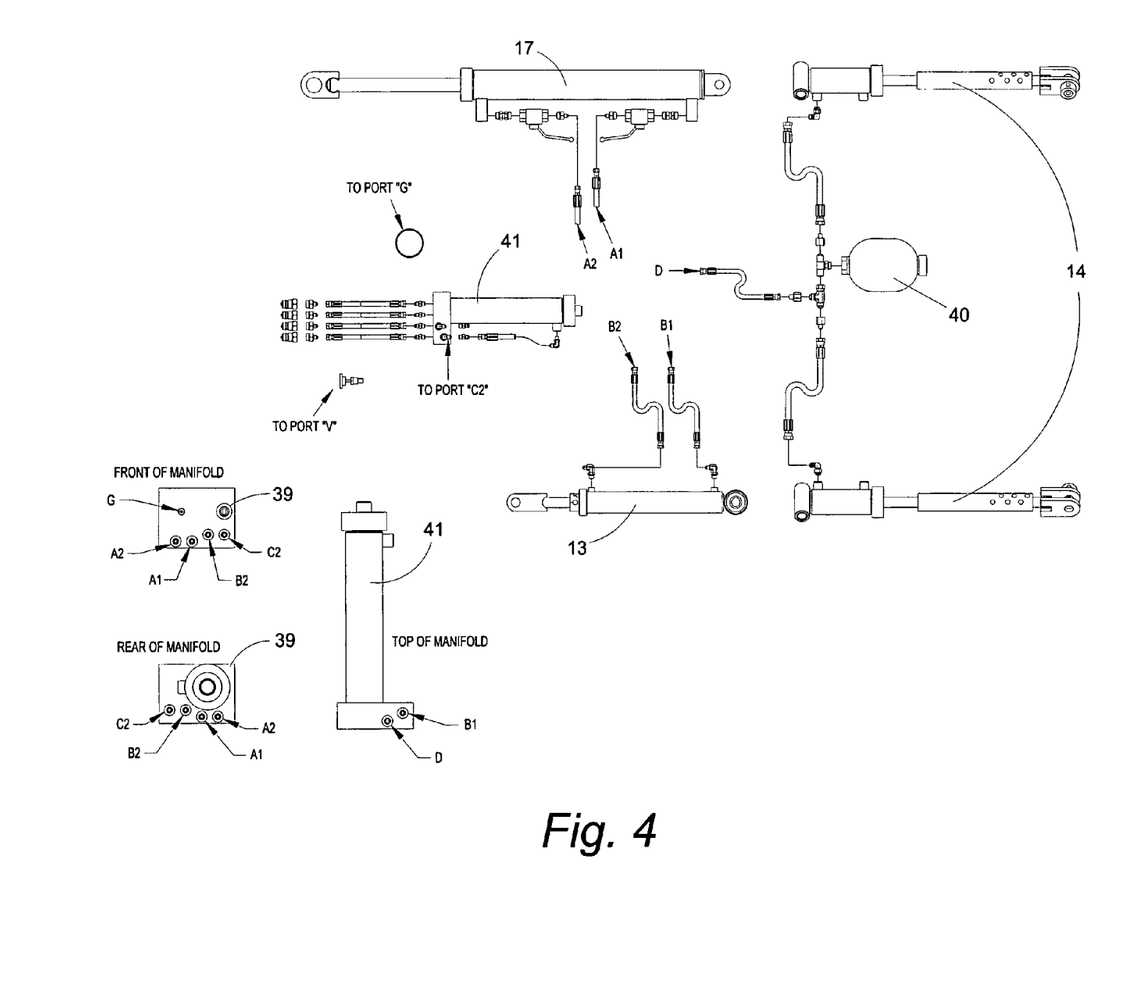
FIG. 4 is an exploded view of the hydraulic circuit in the embodiment of FIG. 1.

Charging of the lift/flotation circuit is necessary in order to insure that the take-up cylinder 41, a component of the mower hydraulic system, yet not strictly speaking a part of the suspension system, is properly filled with oil. The lift/flotation cylinders 14 and the tractor remote valve 87 can be directly connected or isolated by means of the valve 39. In the first embodiment, as illustrated in FIG. 4, the valve 39 is set in a manifold at the base of the take-up cylinder 41. Charging is completed by allowing oil to flow through the valve 39, when opened, through the lines to the take-up cylinder 41, while first allowing air to escape at the take-up cylinder, and then to fully extend that cylinder, while also purging air out of the lines between the valve 39 and the lift/flotation cylinders 14 and the pressure gage 60. The tractor remote valve 87 is held in the position to force oil to the circuit until the lift/flotation cylinders 14 are in the extended position, and the header 6 is lifted to the transport position shown in FIG. 2*a*.

After this first step of the charging procedure, the valve 39 is locked, isolating the lift/flotation cylinders 14 from direct connection to the tractor hydraulics. In the present embodiment for a fixed-frame mower 1 as in FIGS. 1, 2*a* and 2*b*, the accumulator 40 is biased so as to act like a compressive spring by plumbing it to the extend port of the lift/flotation cylinders 14, most clearly shown in FIGS. 3 and 4. Thus, during this first step of the charging procedure, the tractor lifts the cutter bar 9 and pressurizes the accumulator 40. To complete the charging procedure the tractor remote valve 87 is opened to the tractor hydraulic fluid reservoir so that it does not force oil through the remote valve 87. This allows the oil to flow from the take-up cylinder 41 to the tractor hydraulic reservoir. Then the valve 39 is opened, either manually or electronically by the operator, to allow gravity to work against the accumulator 40 to lower the cutter bar 9 to the ground. The hydraulic system pressure can be viewed on a pressure gauge 60 so that the operator can bleed the valve 39 to allow the cutter bar 9 to press against the ground with appropriate pressure. This is done by pre-determining mower model-specific values for hydraulic system pressure at which the operator can close the valve 39 to maintain. The bias of the accumulator 40 to lift the cutter bar 9 keeps the cutter bar 9 from digging into the ground surface, yet is sufficiently small to allow gravity to press the cutter bar 9 against the surface and maintain continuous contact. This property of the cutter bar 9 is herein defined for the purposes of this document, including the claims, as "float."

Oil in the mower hydraulic system will constantly be seeking to occupy volume so as to obtain equilibrium pressures throughout the system. If the take-up cylinder valve 39 is locked, oil flow is restricted to flowing between the suspension cylinders 14 and the accumulator 40. Thus, with the valve 39 locked, the cutter bar 9 cannot be lifted or lowered via the tractor hydraulic system but only by the exchange of oil between the cylinders 14 and accumulator 40 as would be caused by variations in the force the ground exerts on the cutter bar 9 due to ground surface irregularity while mowing.

As the mower passes over uneven ground, the ground exerts changing forces on the cutter bar(s) 9. The oil can flow between the cylinders 14 and the accumulator 40 to constantly maintain system pressure so that good contact between the cutter bar 9 and the ground is maintained.

Figure 5A:
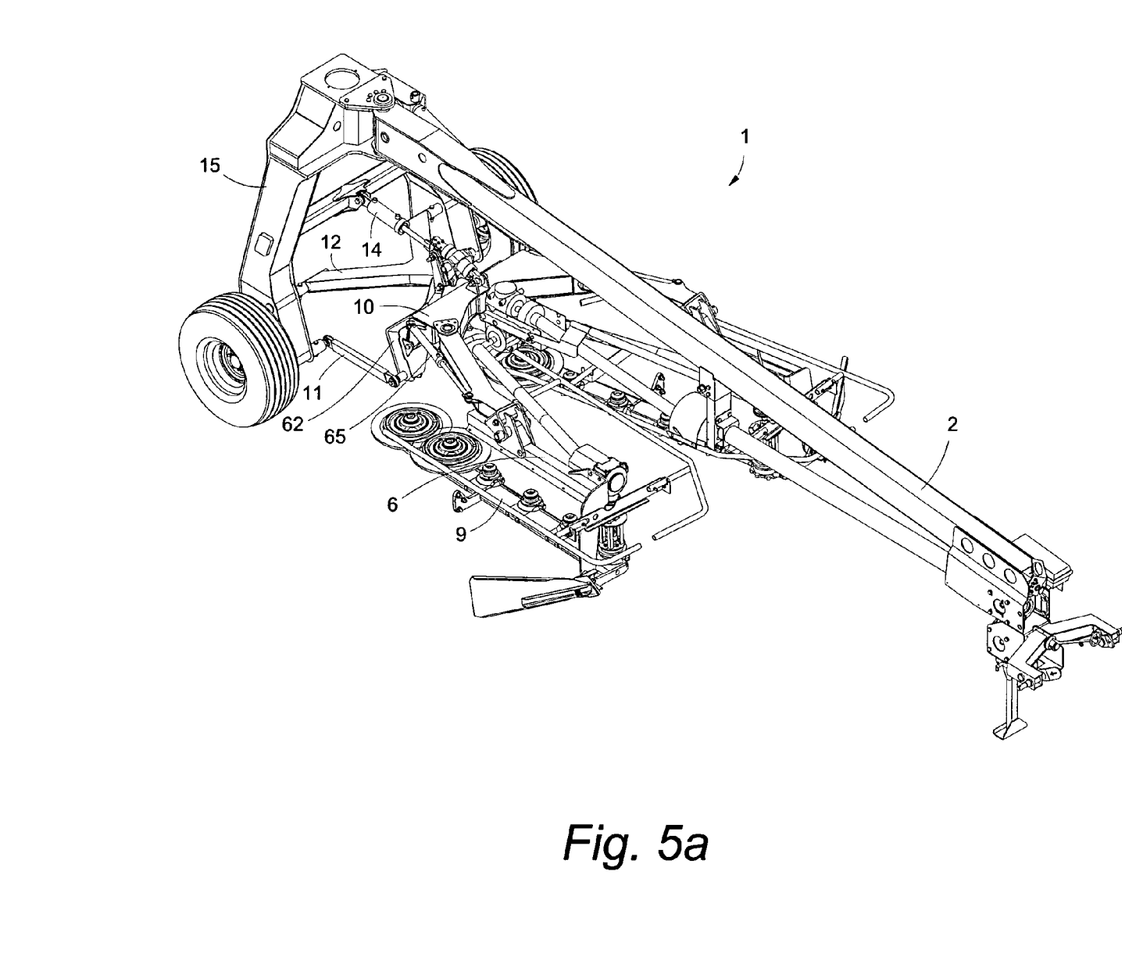
FIG. 5a is an isometric view of a mower in a transport configuration in an alternative embodiment as used on a multi-frame mower having the main frame and sub-frame connected by a single, one-way suspension cylinder.
Figure 5B:
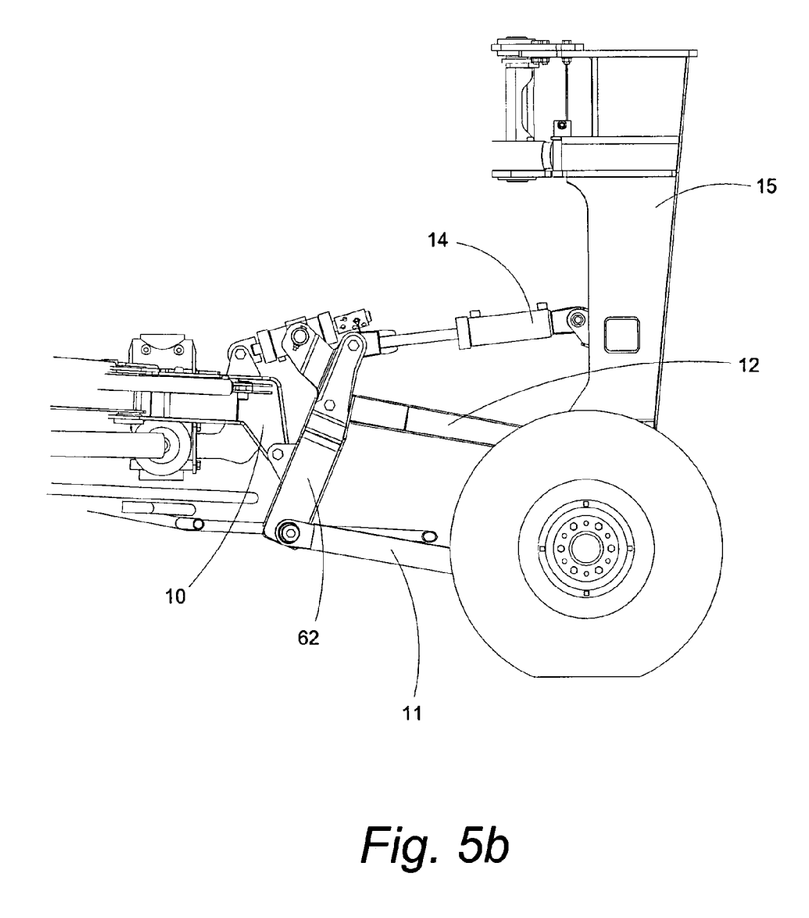
Figure 5C:
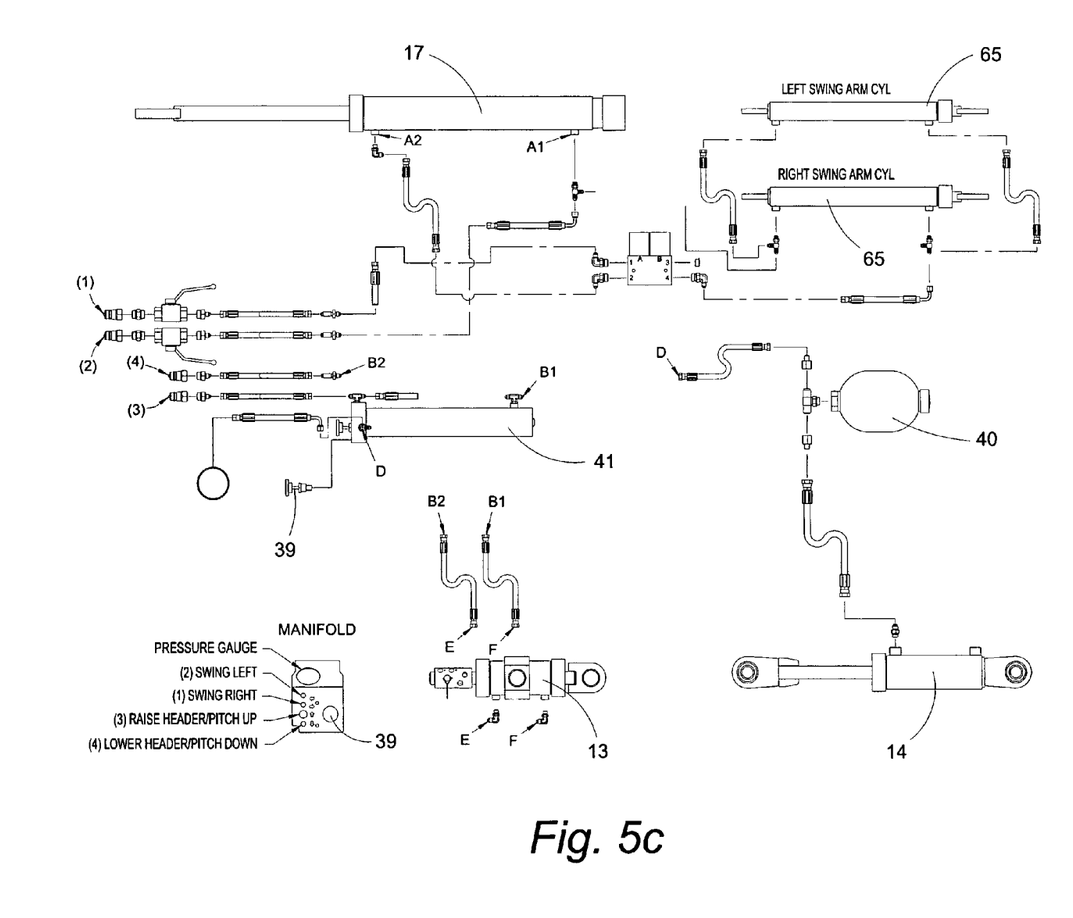
Figure 5D:
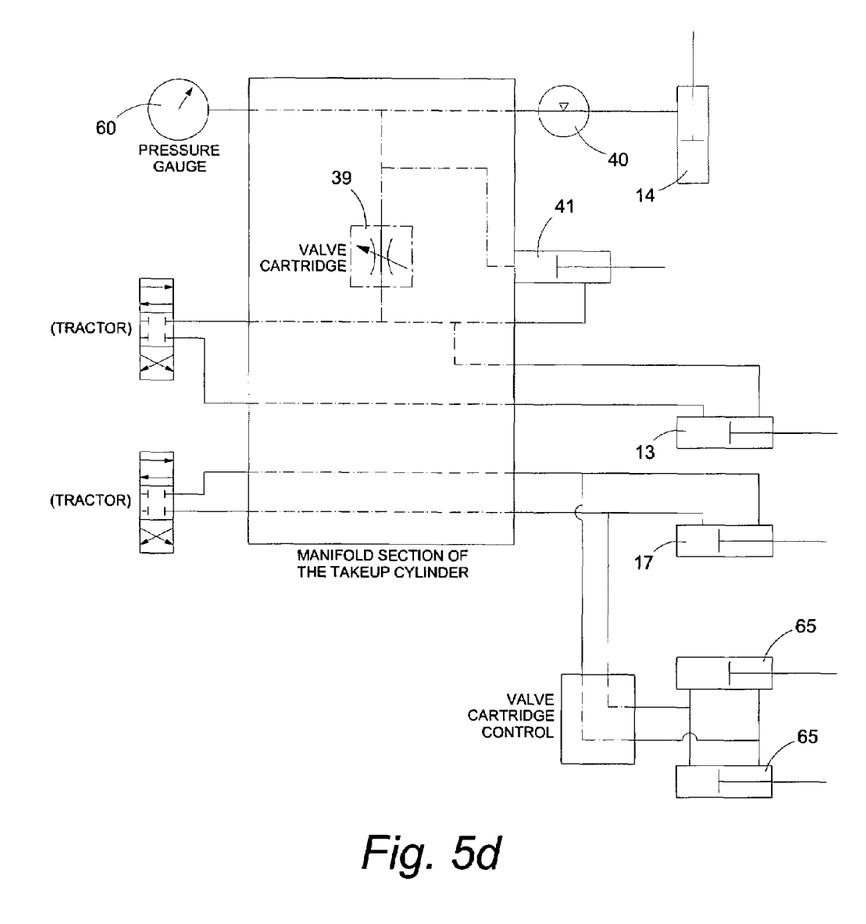
FIG. 5d is a schematic representation of the alternative embodiment of the mower hydraulic system.

In the first embodiment for a fixed-frame mower, the suspension cylinders 14 are attached to a pivoting link 42 such that extending the cylinders 14 causes the header 6 to lift, while retracting the cylinder 14 lowers the header 6 to the ground. In an alternative embodiment, valuable to mowers which may have separate configurations for transport and mowing, a single one-way suspension cylinder 14 may be used as shown in FIGS. 5*a*-5*d*. This cylinder 14 could pivotally connect, for instance, to a main frame 15 and a rear sub-frame 62 where the main frame 15 is fixed and the rear sub-frame 62 is allowed to lift, lower, or roll about an axis parallel to a direction of travel. In FIG. 5*a*, the rear sub-frame 62 maintains its orientation to the ground by a four-bar linkage comprising an upper link set 12 and a lower link set 11. The four-bar linkage is described more fully in U.S. patent application Ser. No. 11/927,866, filed Oct. 30, 2007, and is hereby incorporated by reference herein in its entirety.

The rear sub-frame 62 is pivotally attached to a front sub-frame 10, to which the header 6 is ultimately attached. The rear sub-frame 62 is a link within the four-bar linkage, and the orientation of the sub-frame 62 is dictated thereby. The front sub-frame 10 may be permitted to pivot relative to the rear sub-frame 62 in order to orient the header 6 in an appropriate position for operation or transport.

Swing arm cylinders 65 are provided on both sides of the agricultural mower 1 to pivot the tool bars 9 relative to the front sub-frame 10.

In this second embodiment, the hydraulic system works by the same principles as in the first embodiment. However, the single cylinder 14 attached to the mower 1 as stated is configured to lift the sub-frame 10, 62 by retracting and to lower the sub-frame 10, 62 by extending. In this embodiment the accumulator 40 is plumbed to the retract port of the cylinder 14, as clearly illustrated in FIGS. 5c and 5d.

Operational Process (Either Embodiment)

1) Open the take-up valve 39.
2) Using the tractor as the power source, pressurize the mower hydraulic system. The sub-frame/header 6 will rise to a maximum height due to full retraction of the take-up cylinder 41 and to fully stroking the cylinders 14.
3) Close the take-up valve 39.
4) Put the tractor in float.
5) Crack the valve 39 slowly to bleed excess pressure until the appropriate pressure is read from the gauge. The appropriate pressure will be established for each individual towed mower 1 model on which the present invention is incorporated.
6) Lock the valve 39 at an appropriate pressure. The cutter bars 9 will contact the ground with the hydraulic suspension of the present invention giving it the appropriate amount of contact pressure. The mower 1 is operational.

As an alternative to step 2, using the tractor as the power source . . . , the pressure to the mower hydraulic system may be provided from the gas side of the accumulator 40. Pressurized air, nitrogen, carbon dioxide, argon, helium, or any other appropriate gas may be used to effect this pressurization.

The embodiments of the novel suspension system herein described may be utilized for any implement making use of a floating header. The invention is not intended to be limited to agricultural mowers.

The above embodiments are the preferred embodiments, but this invention is not limited thereto. It is, therefore, apparent that many modifications and variations of the present invention are possible in light of the above teachings. It is, therefore, to be understood that within the scope of the appended claims, the invention may be practiced otherwise than as specifically described.

We claim:

1. A method of suspending a floating header, a component of a fixed-frame, towed implement, the towed implement comprising a tongue to which a prime mover is attached, a frame, the floating header, a first hydraulic cylinder, and a hydraulic accumulator, the method comprising:
   (a) operatively attaching a first end of the first hydraulic cylinder to the frame;
   (b) operatively attaching a second end of the first hydraulic cylinder to the floating header;
   (c) lifting the floating header by pressurizing a hydraulic system to move a ram of the first hydraulic cylinder while simultaneously pressurizing the hydraulic accumulator;
   (d) reducing a pressure in the hydraulic accumulator to a predetermined value of pressure, thereby reducing a pressure to the first hydraulic cylinder;
   (e) lowering the floating header of the fixed-frame, towed implement to a supporting surface while reducing the pressure in the hydraulic accumulator; and
   (f) suspending a portion of the floating header of the fixed-frame, towed implement with the first hydraulic cylinder, thereby allowing said floating header to float.

2. The method of claim 1 wherein the fixed-frame, towed implement additionally comprises a valve, the method additionally comprising:
   (a) hydraulically connecting a first port of the valve to a source of pressurized hydraulic fluid;
   (b) hydraulically connecting a second port of the valve to a first port of the hydraulic accumulator; and
   (c) hydraulically connecting a second port of the hydraulic accumulator to a port of the first hydraulic cylinder.

3. The method of claim 2 additionally comprising:
   (a) opening the valve to a throughflow of hydraulic fluid;
   (b) providing high pressure hydraulic fluid from the source of pressurized hydraulic fluid to the first port of the valve;
   (c) permitting the ram of the first hydraulic cylinder to move to position the header to a raised position;
   (d) closing the valve to the throughflow of hydraulic fluid;
   (e) reducing a pressure from the source of pressurized hydraulic fluid to the first port of the valve;
   (f) reopening the valve to the throughflow of hydraulic fluid until the pressure in the hydraulic accumulator reaches the predetermined value; and
   (g) closing the valve to the throughflow of hydraulic fluid.

4. The method of claim 2 wherein the fixed-frame, towed implement additionally comprises a second hydraulic cylinder, the method additionally comprising:
   (a) hydraulically connecting a first port of the second hydraulic cylinder to the source of pressurized hydraulic fluid; and
   (b) hydraulically connecting a second port of the second hydraulic cylinder to the first port of the hydraulic accumulator.

5. The method of claim 1 wherein operatively attaching the second end of the first hydraulic cylinder to the floating header comprises:
   (a) operatively, pivotally attaching the second end of the first hydraulic cylinder to a first pivot of a pivoting link; and
   (b) operatively, pivotally attaching a second pivot of a pivoting link to the floating header.

6. The method of claim 1 wherein said prime mover is a tractor operatively attached to the tongue.

7. An apparatus for suspending a floating header on a fixed-frame, towed implement comprising:
   (a) a fixed, towed vehicle frame, unarticulated relative to a ground-engaging wheel axle;
   (b) a source of pressurized hydraulic fluid comprising a first valve;
   (c) a second valve comprising a first valve port in hydraulic communication with the source of pressurized hydraulic fluid and a second valve port;
   (d) a hydraulic accumulator comprising a first hydraulic accumulator port in hydraulic communication with the second valve port and a second hydraulic accumulator port; and
   (e) a first hydraulic cylinder comprising a first end operatively attached to the towed vehicle frame, a second end operatively attached to the floating header, and a port in communication with the second hydraulic accumulator port such that the hydraulic accumulator may be removed from communication with the source of pressurized hydraulic fluid when the second valve is closed, the first hydraulic cylinder used to provide lift and suspension to the floating header.

8. The apparatus of claim 7 additionally comprising a pivoting link comprising a first pivot connection, operatively, pivotally connected to the second end of the first hydraulic cylinder and second pivot connection, operatively, pivotally connected to the floating header of the towed implement.

9. The apparatus of claim 7 additionally comprising a second hydraulic cylinder comprising a first port in hydraulic communication with the source of pressurized hydraulic fluid and a second port in communication with the first hydraulic accumulator port.

10. A method of providing both lift and variable-height suspension of a floating header on a fixed-frame, towed implement, the implement comprising a hydraulic circuit, the hydraulic circuit comprising a source of pressurized hydraulic fluid, at least one hydraulic cylinder, and a hydraulic accumulator, the method comprising:
   (a) pressurizing the hydraulic accumulator to a predetermined pressure;
   (b) placing the at least one hydraulic cylinder in hydraulic communication with the hydraulic accumulator;
   (c) supporting at least a portion of a weight of the floating header on the fixed-frame, towed implement with the at least one hydraulic cylinder while the at least one hydraulic cylinder is in hydraulic communication with the hydraulic accumulator;
   (d) exchanging hydraulic fluid between the at least one hydraulic cylinder and the hydraulic accumulator to maintain a support of the header at varying header heights;
   (e) removing the at least one hydraulic cylinder from hydraulic communication with the hydraulic accumulator; and
   (f) lifting the floating header on the fixed-frame, towed implement with the at least one hydraulic cylinder while the at least one hydraulic cylinder is not in hydraulic communication with the hydraulic accumulator.

11. The method of claim 10 wherein pressurizing the hydraulic accumulator to the predetermined pressure comprises:
   (a) placing the at least one hydraulic cylinder in hydraulic communication with the source of pressurized hydraulic fluid;
   (b) lifting the floating header by pressurizing the hydraulic circuit to move a ram of the at least one hydraulic cylinder while simultaneously pressurizing the hydraulic accumulator; and
   (c) reducing a pressure in the hydraulic accumulator to a predetermined value of pressure, thereby reducing a pressure to the at least one hydraulic cylinder.

12. The method of claim 10 wherein pressurizing the hydraulic accumulator to predetermined pressure comprises adding a gas to the hydraulic accumulator to increase a pressure therein to the predetermined pressure.

13. The method of claim 12 wherein adding a gas comprises adding a gas selected from the group consisting of: air, nitrogen, carbon dioxide, argon, and helium.

14. The method of claim 10 additionally comprising:
   (a) placing the hydraulic accumulator in hydraulic communication with the source of pressurized hydraulic fluid; and
   (b) allowing the hydraulic circuit to completely fill with oil.

* * * * *